United States Patent [19]
Park et al.

[11] Patent Number: 5,777,683
[45] Date of Patent: Jul. 7, 1998

[54] ULTRASONIC IMAGING SYSTEM ADOPTING A NON-INTERLACED SCANNING METHOD

[75] Inventors: Yong-heon Park; Byung-sun Yoo; Seok-bin Ko, all of Seoul, Rep. of Korea

[73] Assignee: Medison Co., Ltd., Kangwon-do, Rep. of Korea

[21] Appl. No.: 646,618

[22] Filed: May 8, 1996

[30] Foreign Application Priority Data

May 8, 1995 [KR] Rep. of Korea .................. 95-11168

[51] Int. Cl.$^6$ ................................................. H04N 7/01
[52] U.S. Cl. ..................... 348/458; 348/552; 348/448; 128/660.04
[58] Field of Search ..................... 348/442, 446, 348/448, 458, 552, 553, 584; 128/660.04; 386/52

[56] References Cited

U.S. PATENT DOCUMENTS 4,398,540  8/1983  Takemura et al. .................. 128/660
4,872,054  10/1989  Gray et al. .................. 348/553
5,510,832  4/1996  Garcia .................. 348/56

*Primary Examiner*—Victor R. Kostak
*Attorney, Agent, or Firm*—Dilworth & Barrese

[57] ABSTRACT

An ultrasonic imaging system for an ultrasonic imaging unit generating ultrasonic image data of an interlaced scanning mode, includes a display of a non-interlaced scanning mode and a scanning mode converter for converting ultrasonic image data of the interlaced scanning mode received from the ultrasonic imaging unit into data of a non-interlaced scanning mode and supplying the ultrasonic image data of the non-interlaced scanning mode to the non-interlaced scanning mode display, to thereby provide an ultrasonic image having a better quality of picture in comparison with the interlaced scanning mode. The only ultrasonic image data in which the ultrasonic image data is displayed together with additional data on a screen by the image display of the non-interlaced scanning mode, is converted in the interlaced mode, thereby recording the ultrasonic image data via the conventional VCR.

4 Claims, 2 Drawing Sheets

ULTRASONIC IMAGING SYSTEM ADOPTING A NON-INTERLACED SCANNING METHOD

BACKGROUND OF THE INVENTION

The present invention relates to an ultrasonic imaging system, and more particularly, to an ultrasonic imaging system adopting a non-interlaced scanning mode in which digital image data of an interlaced scanning mode output from an ultrasonic imaging unit is converted into data of a non-interlaced scanning mode to then display the converted resultant data.

Various graphic adapters have been recently developed to provide a better graphic atmosphere since personal computers (PCs) have been commercialized. Among the graphic adapters, a video graphic array (VGA) card is being usually used. Meanwhile, a PC to which equipment such as a TV tuner, a VTR, a laser disk player (LDP) or a video camera is connected, uses a computer graphic card to enable a user to watch and work an image.

A general interlaced scanning mode has been used in an image signal processing apparatus such as a TV set, a facsimile apparatus, medical equipments. An ultrasonic diagnostic apparatus among the medical equipments is used to scan an object being diagnosed to detect whether there is an attack of a disease. Therefore, the user can monitor a testing result of the ultrasonic diagnostic apparatus via a PC monitor or a VCR system.

FIG. 1 is a block diagram of a conventional ultrasonic imaging system adopting an interlaced scanning mode. An ultrasonic imaging unit 10 produces digital image data of an interlaced scanning mode using diagnostic information obtained by an ultrasonic scan. The produced digital image data is output to a digital-to-analog converter (DAC) 12. The DAC 12 converts the received digital image data into an analog signal. The analog signal is output to an image display unit 30. The image display unit 30 including a VCR 31 and an interlaced scanning mode monitor 33 displays an interlaced scanning mode image signal on a screen.

Since such a conventional ultrasonic imaging system displays the ultrasonic image data obtained by the ultrasonic scan on the screen via the PC monitor or other image displays, problems such as a flicker of the scanning lines and a deterioration of resolution have occurred. These problems cause to deteriorate a quality of picture in an ultrasonic image to be displayed on the screen. When an image representing additional information such as a menu for a key operation is displayed on the screen in the form of superimposing the additional image on the ultrasonic image so as to efficiently use an ultrasonic imaging system, a quality of picture of the ultrasonic image becomes worse due to the additional image.

SUMMARY OF THE INVENTION

Therefore, to solve the above problems, it is an object of the present invention to provide an ultrasonic imaging system adopting a non-interlaced scanning mode in which digital image data of an interlaced scanning mode output from an ultrasonic imaging unit is converted into data of a non-interlaced scanning mode (a sequential scanning mode) to then display the converted resultant data.

To accomplish the above object of the present invention, there is provided an ultrasonic imaging system for an ultrasonic imaging unit generating ultrasonic image data of an interlaced scanning mode, the ultrasonic imaging system comprising:

a display of a non-interlaced scanning mode; and a scanning mode converter for converting ultrasonic image data of the interlaced scanning mode received from the ultrasonic imaging unit into data of a non-interlaced scanning mode and supplying the ultrasonic image data of the non-interlaced scanning mode to the non-interlaced scanning mode display.

BRIEF DESCRIPTION OF THE DRAWINGS

The preferred embodiments are described with reference to the drawings wherein.

DETAILED DESCRIPTION OF THE PREFERRED EMBODIMENT

Figure 3:
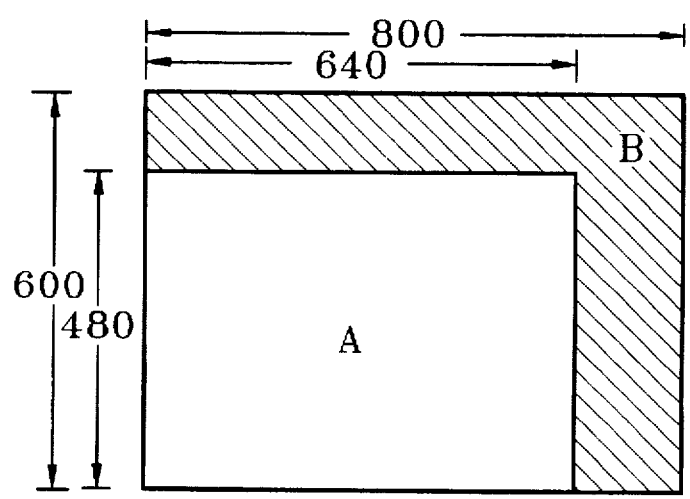
FIG. 3 is a conceptual diagram for explaining a window set by a window setter 24.

A preferred embodiment of the present invention will be described below in more detail with reference to the accompanying drawings FIGS. 2 and 3.

Figure 1:
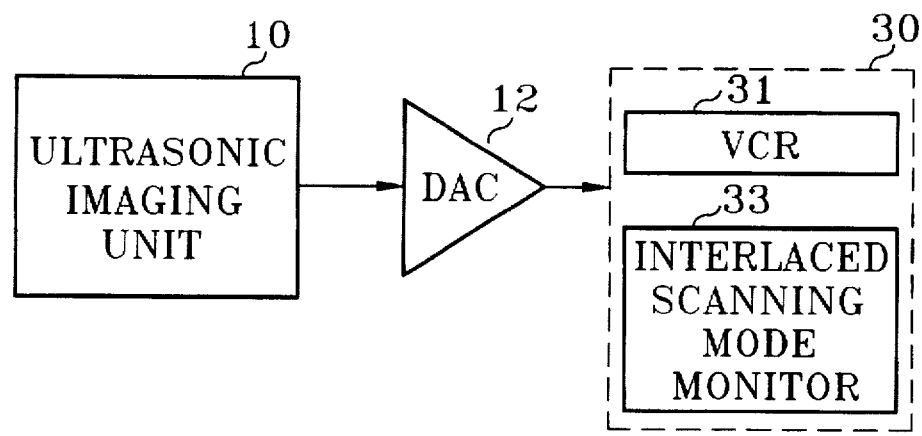
FIG. 1 is a block diagram of a conventional ultrasonic imaging system of an interlaced scanning mode.
Figure 2:
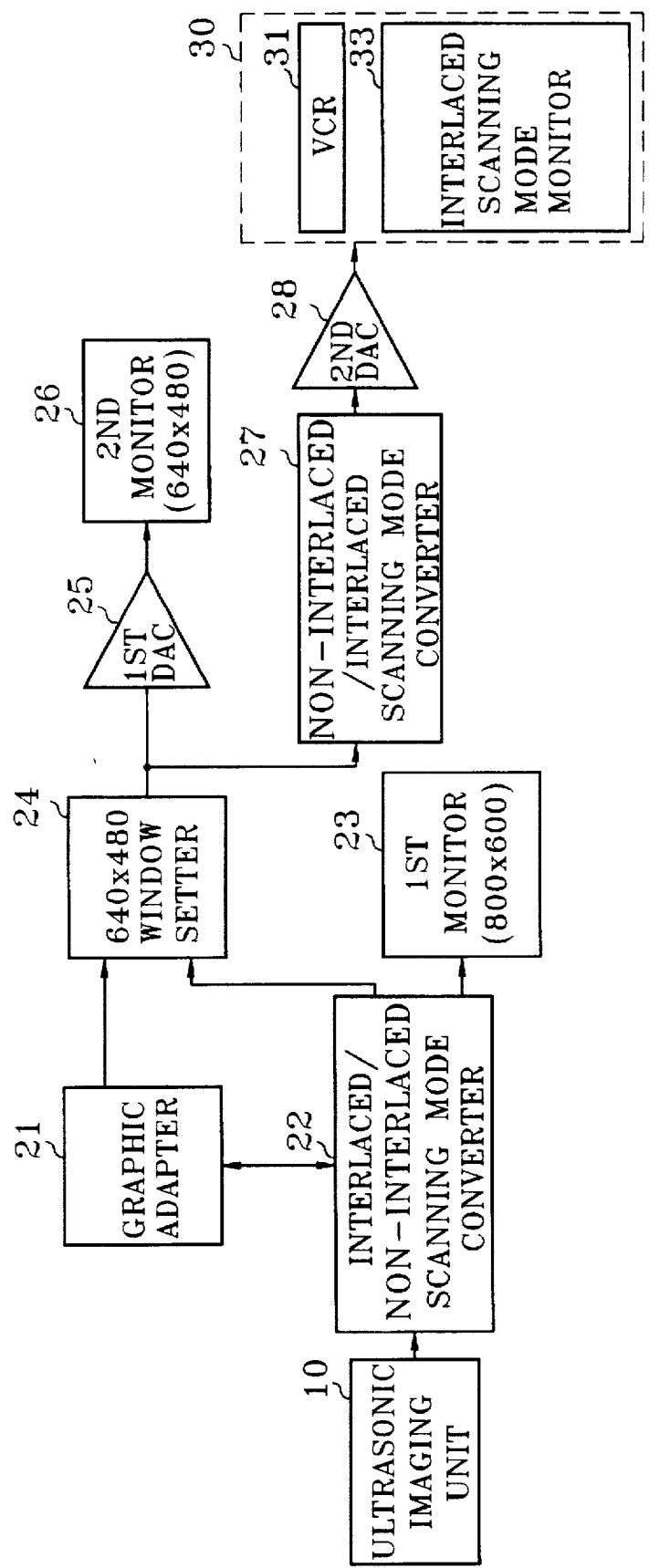
FIG. 2 is a block diagram of an ultrasonic imaging system according to a preferred embodiment of the present invention.

In FIG. 2 showing an ultrasonic imaging system according to a preferred embodiment of the present invention, ultrasonic image data obtained by an ultrasonic scanner (not shown) is displayed using a personal computer. The FIG. 2 apparatus includes the ultrasonic imaging unit 10 and the image display unit 30 having the VCR 31 and the interlaced scanning monitor 33, all of which are same as those shown in FIG. 1. The FIG. 2 system includes a graphic adapter 21, an interlaced/non-interlaced mode converter 22, first and second monitors 23 and 26, a window setter 24, a digital-to-analog converters (DACs) 25 and 28 and a non-interlaced/interlaced mode converter 27.

A detailed construction of the FIG. 2 apparatus and operation thereof will be described below.

The ultrasonic imaging unit 10 outputs ultrasonic image data of an interlaced scanning mode corresponding to an ultrasonic signal received by an ultrasonic scan. The interlaced/non-interlaced scanning mode converter 22 converts the ultrasonic image data output from the ultrasonic imaging unit 10 into data of non-interlaced scanning mode. The interlaced/non-interlaced scanning mode converter 22 according to a preferred embodiment of the present invention produces ultrasonic image data having the number of pixels of a size 800×600. Since the interlaced/non-interlaced scanning converter 22 adopts a well-known interlaced/non-interlaced scanning mode conversion technology, the detailed description thereof will be omitted. The interlaced/non-interlaced scanning mode converter 22 outputs the ultrasonic image data converted into the non-interlaced scanning mode to a first monitor 23. The first monitor 23 displays the received ultrasonic image data having the number of the pixels of the size 800×600 on a screen according to the non-interlaced scanning mode. The graphic adapter 21 connected to the interlaced/non-interlaced scanning mode converter 22 via a connector represented as a double-arrow line is an existing VGA card in case of this embodiment. When the interlaced/non-interlaced scanning mode converter 22 receives menu data for helping user's manipulation and additional data having additional processed information with respect to the ultrasonic image from the graphic adapter 21, the converter 22 supplies image data obtained by superimposing the ultrasonic image data on the additional data according to a known signal processing method for an existing on-screen-display, to the first monitor 23. In this case, since both the ultrasonic image and the additional data for the user are displayed by the non-interlaced scanning mode on the screen, the present invention provides a better quality of picture to the user in comparison with the existing ultrasonic imaging unit.

The window setter 24 receives both the ultrasonic image data which is converted into the non-interlaced scanning mode and output from the interlaced/non-interlaced scanning mode converter 22 and the additional data output from the graphic adapter 21. The window setter 24 detects only ultrasonic image data contained in a window of a predetermined size among the received ultrasonic image data. The window setter 24 according to the present invention receives the ultrasonic image data representing a size 800×600 from the interlaced/non-interlaced scanning mode converter 22 and extracts ultrasonic image data contained in a pixel of a size 640×480 from the received ultrasonic image data. The window setter 24 processes signals so that the extracted ultrasonic image data is represented in the window of the pixel size 640×480 and that the additional data from the graphic adapter 21 is represented in the other screen area. Since such a signal processing is well-known in connection with a picture-in-picture (PIP) technology and a picture divisional technology, the detailed description thereof will be omitted. The data output from the window setter 24 is output to the first DAC 25 and the non-interlaced/interlaced scanning mode converter 27. The first DAC 25 converts the data supplied from the window setter 24 into an analog signal and then supplies the converted signal to the second monitor 26. The second monitor 26 displays the analog signal on the screen as shown in FIG. 3 which shows a conceptual diagram for explaining a window set by a window setter 24. In FIG. 3, a portion "A" is an area where the ultrasonic image data is displayed and a portion "B" is an area where the additional data is displayed.

The non-interlaced/interlaced scanning mode converter 27 removes the additional data from the data supplied from the window setter 24, and converts the ultrasonic image data into data of the interlaced scanning mode. The ultrasonic image data of the non-interlaced scanning mode is converted into an analog signal by the second DAC 28 and then is applied to the image display unit 30. The VCR 31 of the interlaced scanning mode records the received ultrasonic image data on a magnetic tape and the interlaced scanning mode monitor 33 displays the signal on the screen. The ultrasonic image data passing through the window setter 24 and the non-interlaced/interlaced scanning mode converter 27 becomes an image having a size less than the whole ultrasonic image obtained by the ultrasonic scan. It is preferable that the window setter 24 is designed so that a position of the window with respect to the whole ultrasonic image can be controlled manually or automatically. Thus, the VCR 31 can record an image signal more effectively on the magnetic tape.

As described above, the present invention converts the ultrasonic image data of the interlaced scanning mode output from the ultrasonic imaging unit into the ultrasonic image data of the non-interlaced scanning mode and to display the same on the screen, to thereby provide an image of a better quality of picture. Since the ultrasonic image data and the additional data are displayed on the separate areas on the screen, the user can recognize all data more accurately. In addition, since the ultrasonic image data having a smaller area than the whole ultrasonic image data area can be recorded on the existing interlaced scanning mode VCR, an effective signal recording is possible and the existing equipment can be used without modification.

While only certain embodiments of the invention have been specifically described herein, it will apparent that numerous modifications may be made thereto without departing from the spirit and scope of the invention.

What is claimed is:

1. An ultrasonic imaging system for an ultrasonic imaging unit generating ultrasonic image data of an interlaced scanning mode, said ultrasonic imaging system comprising:

a display of a non-interlaced scanning mode;

a first scanning mode converter for converting ultrasonic image data of the interlaced scanning mode received from said ultrasonic imaging unit into data of a non-interlaced scanning mode and supplying the ultrasonic image data of the non-interlaced scanning mode to said non-interlaced scanning mode display;

an interlaced scanning mode monitor; and a second scanning mode converter for converting non-interlaced scanning mode data from said first scanning mode converter to interlaced data for display on said monitor.

2. The ultrasonic imaging system according to claim 1, wherein said scanning mode converter processes the ultrasonic image data obtained by the scanning mode conversion to be displayed on the whole screen of said display.

3. An ultrasonic imaging system for an ultrasonic imaging unit generating ultrasonic image data of an interlaced scanning mode, said ultrasonic imaging system comprising:

a display of a non-interlaced scanning mode;

a scanning mode converter for converting ultrasonic image data of the interlaced scanning mode received from said ultrasonic imaging unit into data of a non-interlaced scanning mode and supplying the ultrasonic image data of the non-interlaced scanning mode to said non-interlaced scanning mode display;

a graphic adapter; and a window setter for processing the ultrasonic image data from said scanning mode converter to be displayed in a window of a first size smaller than that of the whole screen, processing additional information data applied via said graphic adapter to be displayed on the other areas excluding the window of the first size, and supplying the resulting data to said display.

4. The ultrasonic imaging system according to claim 3, further comprising means for detecting the ultrasonic image data from the data output from said window setter and converting the detected ultrasonic image data into data of an interlaced scanning mode.

* * * * *